Jan. 12, 1960  J. T. GRESHAM  2,920,373
MANUFACTURE OF WADDING
Filed June 24, 1955  2 Sheets-Sheet 1

INVENTOR.
JAMES T. GRESHAM
BY
ATTORNEYS

Jan. 12, 1960 J. T. GRESHAM 2,920,373
MANUFACTURE OF WADDING
Filed June 24, 1955 2 Sheets-Sheet 2
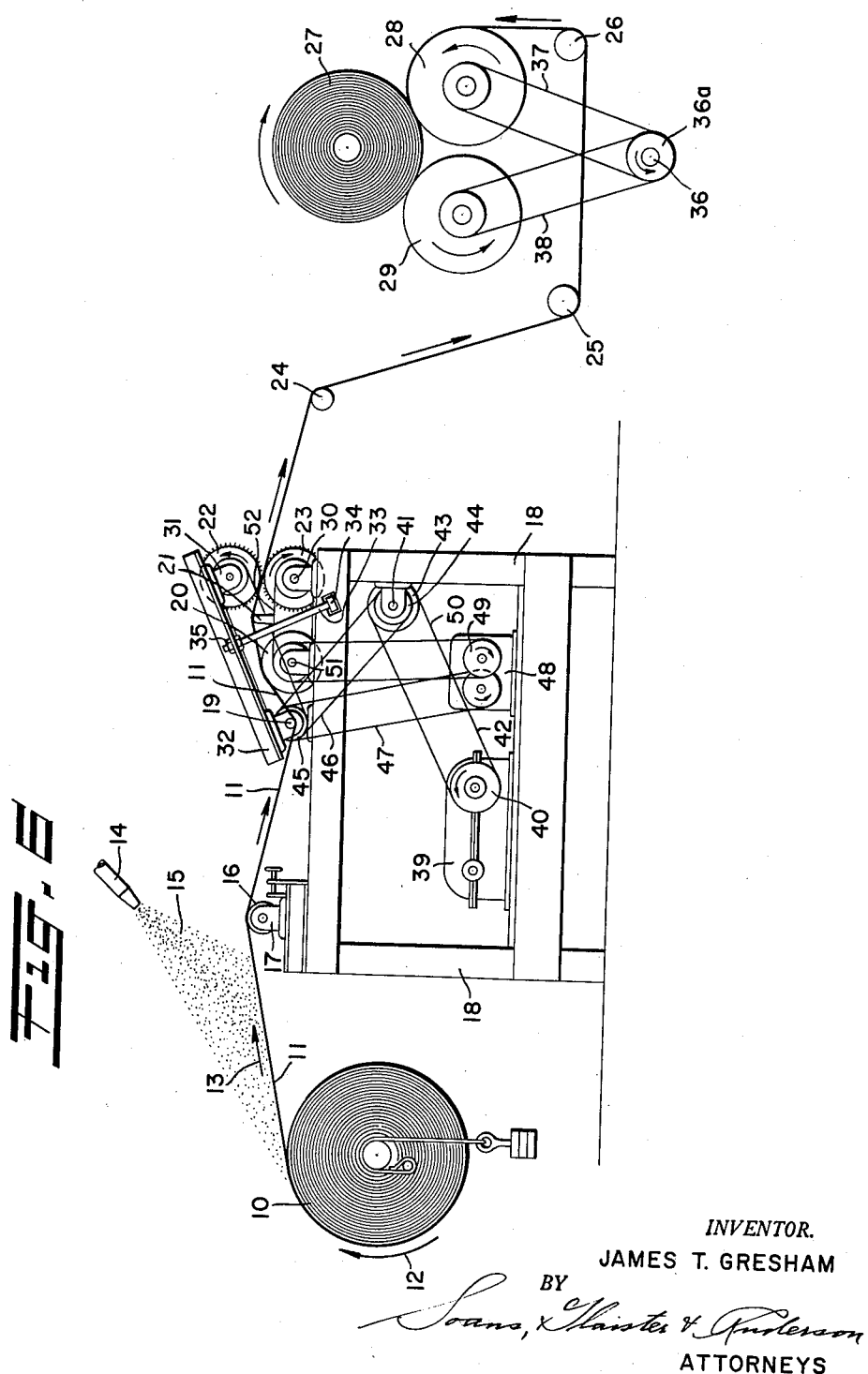
INVENTOR.
JAMES T. GRESHAM
BY
Soans, Shainter & Anderson
ATTORNEYS

United States Patent Office 2,920,373
Patented Jan. 12, 1960

2,920,373

MANUFACTURE OF WADDING

James Tyson Gresham, Menasha, Wis., assignor, by mesne assignments, to Kimberly-Clark Corporation, a corporation of Delaware Application June 24, 1955, Serial No. 517,893

2 Claims. (Cl. 28—72.2)

This invention relates to the manufacture of wadding, and has particular value in connection with the production of wadding composed of a number of plies or sheets of fibrous material, for example, paper tissue.

Wadding of the type described during the past 40 years has been used in various arts and industries for various purposes. For example, it may be used as a padding material. It may be used as thermal insulation for buildings and other structures, and also as sound-proofing material. It has great utility as a relatively inexpensive and highly efficient lining or backing sheet to be secured within the doors or other spaces in vehicles for heat and sound insulating purposes.

A multi-ply sheet or batt made of several plies or sheets of fibrous material such as paper tissue, although quite efficient as a means for insulating against the passage of heat or sound, and having also great value as a cushioning or padding material for preventing damage to surfaces to which it is applied, as heretofore made has had a serious disadvantage. If the plies are made as separate sheets and then merely superposed one upon the other, there is danger of delamination in handling, or a shifting of the plies in installation or in use. Various attempts, for example, by embossing, have been made to prevent this delamination or shifting of the plies, but so far as I am advised the methods employed have been quite expensive, or the attempts made to prevent delamination have been accompanied by a sacrifice of other properties of the material. For example, the surface irregularity of an embossed product causes the material to be unsuitable for certain uses.

One attempt at solving the problem is the embossing method set forth in the Fourness Patent No. 2,106,426, issued January 25, 1938. This patentee makes use of the principle that when adjacent plies of paper wadding are subjected to heavy pressure, the several plies within the areas of pressure application are, in effect, pressure welded together, and these areas resemble spot welds in their effect in uniting together the plies of the batt. Unfortunately, however, the welds in order to be effective must be of considerable size and this produces a dimpled surface effect which is objectionable in some applications, for example, where a decorative overlay is subsequently applied to the surface of the embossed wadding.

The principal object of this invention is to unite together the separate individual sheets of a multi-ply batt in such a way that the surface of the batt and the bulk of the batt are not materially impaired while at the same time the tendency of the sheets of the batt to delaminate or shift is reduced to a point where this objection to multi-ply wadding of the character set forth, and other objections, have been substantially eliminated. This result is effected at relatively small cost by the use of equipment which is exceedingly simple and inexpensive to construct, install, operate, and maintain.

I have discovered that the objectives set forth may be attained by the use of a process and apparatus which involves the principle of continuously needling the opposite sides or surfaces of the multi-ply batt as it travels through a throat or passageway of sufficient dimensions so that there is no danger of compressing the batt either generally or locally and thereby reducing the thickness of the batt at the points or areas of pressure application.

In applying this principle, various types of apparatus may be employed, but I prefer to propel the multi-ply batt between a pair of supports, synchronized so as to travel continuously in the same direction and at substantially the same speed as the batt is travelling, and fitted with opposed sets of straight needles so mounted on the supports that when the needles travel through the throat on their supports, they will be positioned substantially perpendicular to the plane of travel of the web.

The needles on one side of the throat overlap the needles on the other side, so that in passing through the throat the web will be impaled by the needles from opposite sides. Preferably, on at least one side of the throat, the web will be supported only by the needles so that in effect the web will float through the throat. In the case of batts having ten or more plies, it has not been found necessary that the points of the needles should project or stab through opposite sides of the batt. In fact, in such cases, the surfaces of the batt are less disturbed if the points enter the batt to a depth short of complete penetration. However, the distance of penetration should be such that the level of the bottoms of the small holes formed by the needles on one side should overlap the level of the bottoms of the holes formed by the opposite needles.

Although it is believed that the new method serves to connect or bond together the fibers of adjacent plies, by mechanical or other action of the needles, it has not been possible to ascertain the precise nature of this action.

The supports for the needles may be in the form of continuous belts or the needles may be placed on the circumferences of opposed rolls. I prefer to use rolls, and to secure the needles to the rolls by securing to the peripheries of the rolls flexible strips of needle-bearing material such as leather. The material may be similar to a high quality grade of clothing used on pickers or carding machines. As previously stated, instead of using hooked needles it is advantageous to have the needles arranged with their axes perpendicular to the plane of the needle support and perpendicular to the plane in which the web travels.

Having described in a general way my improved process and apparatus, I will proceed to set forth a description of a preferred embodiment of the invention. To facilitate such description, I refer to the accompanying drawings which illustrate one type of apparatus which has been successfully used by me in producing the improved wadding.

In said drawings:

Fig. 6 is a somewhat diagrammatic side view of the co-ordinated apparatus.

Figure 1:
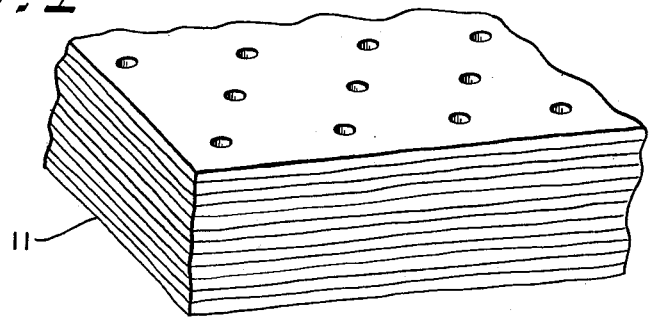
Fig. 1 is an enlarged perspective view of a section of multi-ply wadding which has been subjected to my process by the use of the described apparatus.
Figure 2:
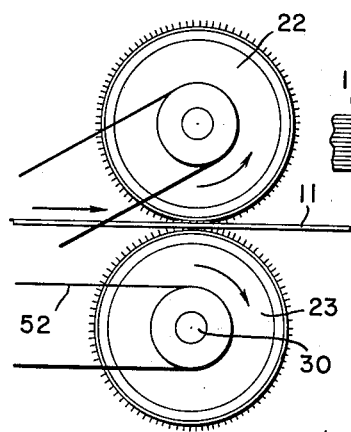
Fig. 2 is a side elevation of the needling rolls.
Figure 3:
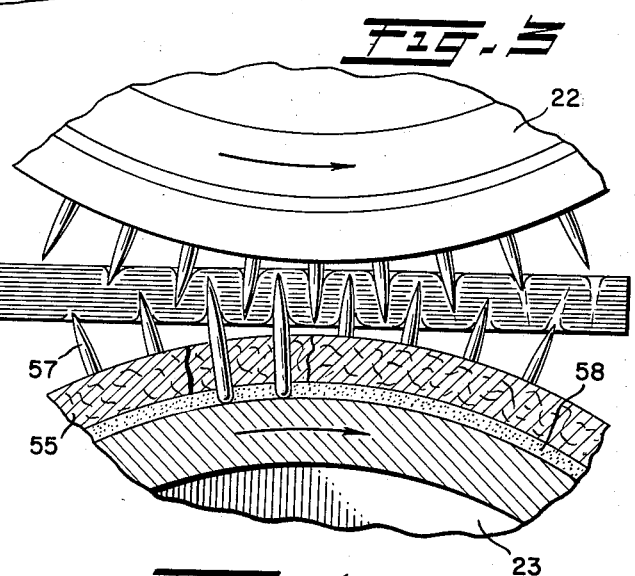
Fig. 3 is an enlargement of a portion of Fig. 2.

Referring to Fig. 6 of the drawings, the numeral 10 represents a cylindrical roll of multi-ply wadding composed of a number of superposed or laminated fibrous webs, for example, sheets of paper tissue. Such tissue is customarily made on a Yankee paper machine supplied with a furnish of 100% chemical pulp or such other grade of furnish as will satisfy the requirements for the ultimate use of the product. Ordinarily, when a good grade of chemical pulp is used, the web of tissue just before it comes off the Yankee cylinder may have a weight of between 1 pound and 6 pounds per 1000 square feet when dried, and after it has been removed from the cylinder by the usual creping doctor said dry weight will be increased in accordance with the creping ratio which may be from about 1½ to 1 to 3 to 1. The creped finished paper, after removal from the Yankee machine by the doctor blade, is wound onto a roll, and after that it is doubled and combined with other sheets from other rolls to form a multiplex pad having the desired number of plies and of the required thickness. My apparatus has been found to work quite successfully on paper tissue wadding having from 4 to 30 plies.

The web 11 is drawn off from the roll 10 in the direction of the arrows 12 and 13. However, in order to make the wadding somewhat more amenable to the needling treatment to which it is to be subjected, I prefer to add a small amount of water, preferably in the form of a fine spray or mist, to at least one side of the web. In the case of a thin web it is ordinarily sufficient to spray the water on the upper surface of the web by means of a high pressure water jet 14 so arranged as to direct upon the upper surface of the web an atomizing spray in the form of a cone or band 15 of exceedingly small particles of water. The amount of water added should be enough so that the tissue contains from 6% to 12% of water, on a bone dry basis, after the spraying treatment.

After being subjected to the water spray, the web 11 travels over the roller 16 carried by suitable bearings 17 mounted on the frame 18 of the apparatus. From the roller 16 the web 11 then travels around another rod or roller 19 also carried by the frame of the machine on a fixed axis. From the roll 19 the web then travels around a driven roller 20 of substantial diameter, said roller being mounted on a stationary axis also carried on the frame 18 of the machine. From the roll 20 the web then travels over the smooth upper edge of a spreader bar 21 which serves to remove any wrinkles from the web before the latter reaches the functional throat or nip of the needling rolls 22 and 23. After leaving the needling throat, the web passes around fixed rollers 24, 25, and 26 and then is wound up into a roll of finished product by conventional rewinding apparatus which comprises supporting rolls 28 and 29, driven at a peripheral speed preferably at least as high as the speed of travel of the web through the apparatus.

The lower roll 23 of the needling throat is mounted on a fixed axis 30 and in suitable bearings mounted on the fixed frame 18 of the apparatus. The upper needling roll 22 is mounted to rotate in bearings 31 carried by the upper end of an inclined frame 32 which is pivoted on the frame 18 on an axis coinciding with the axis of the roll 19. The position of the adjustable roll 22 relative to the fixed-position roll 23 is controlled by pairs of bolts or adjusting rods 33, the lower ends of which have heads 34 seated in slots of the frame 18 while the upper ends of the bolts 33 are threaded and accommodate nuts 35 by means of which said adjustment can be readily effected.

The motive power for propelling the web through the apparatus is provided by a suitable motor or motors not shown. To rewind the web, power is applied to the shafts of rolls 28 and 29 by means of a driven shaft 36, driving pulleys 36a on shaft 36, and belts 37 and 38. Through adjustable speed-reducing gears contained in the housing 39, a power take-off pulley 40 drives a jack shaft 41 through belt 42 and pulley 43. Another pulley 44 on jack shaft 41 drives a pulley 45 through belt 46 and in a similar manner the shaft of the pulley 45 drives the upper needling roll 22. Said shaft also drives a belt 47 which drives suitable gearing contained within the housing 48 so as to impart to the pulley 49 a rotary movement opposite to that of the preceding train of pulleys. The oppositely rotating pulley 49, through a belt 50, drives a pulley on the shaft 51 and that shaft drives the lower needling roll 23 through a suitable pulley and belt 52.

The opposed needling rolls and the clothing therefor are shown best in detail in Figs. 2 to 5, inclusive. As shown best in Fig. 4 and Fig. 5, the clothing 53 may be made in the form of a single strip, preferably of leather, a few inches wide and pierced with uniformly spaced holes arranged preferably in a diamond pattern for accommodating the needles which may be in the form of double-ended wires 54 made in the form of staples, the limbs of the staples passing through the holes made in the leather strip 55, the ends of the limbs of each staple being pointed to form a pair of needle-like elements 57. Preferably, the needles 57 are given a fairly high degree of polish so as to eliminate any undesirable roughness or irregularities, and the axes of the needles 57 are preferably located perpendicular to the plane of the leather backing 55 of the clothing so that when the needles gradually enter and impale the web 11 at one side of the throat and are withdrawn from the web at the other side of the throat, there will be a minimum disturbance of the surface of the web.

Figure 4:
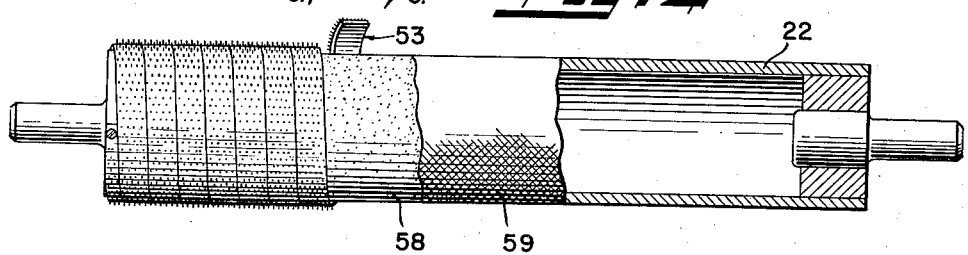
Fig. 4 is a side view of one of the rolls shown in Fig. 2, part of the clothing being removed and part of the roll being in section.
Figure 5:
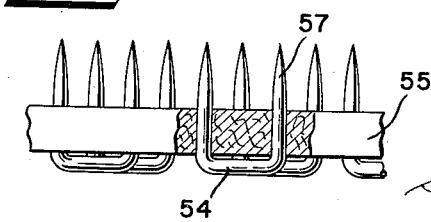
Fig. 5 is a side view, partly in section, of a piece of the clothing.

The clothing 53 may be conveniently applied to the outer circumference of each of the needling rolls 22 and 23 by making the clothing in the form of a continuous strip as shown in Fig. 4, which is wound spirally onto the opposite side of the roll, being preferably secured thereon by means of a layer 58 of suitable cement which will not objectionably impair the flexibility of the leather strip or of the needles carried thereby. If desired, the outer periphery of the roll 22 may be knurled or otherwise roughened as shown at 59.

In using the invention, good results have been obtained with the use of a clothing strip about 7/32 of an inch in thickness with the needles or pins made of wire .065 inch in diameter and projecting a distance of about 3/16 of an inch, being spaced about 5 to the inch in the direction of travel of the strip with the rows about 1/8 of an inch apart, the alternate rows being staggered to provide the diamond pattern as previously referred to. The rolls on which the picker bands are carried may be cylinders having a diameter of about 6 inches, with a face as long as is required to accommodate the width of the batt which is being treated.

Apparatus such as has been described has been operated quite successfully on various thicknesses of wadding or batting made up of from 4 to 30 plies of creped paper of various weights and composition.

In using the equipment, best results for certain purposes are obtained when the spacing of the needling rolls is sufficient to avoid compressing the batt to any great extent. In effect, it appears to be desirable to allow the batt to float through the throat on the needles, so that on one side at least the batt does not come in contact with the needle support. Also, in addition to arranging the needles perpendicular to the surface of the support, they should be of such length, and the spacing of the needling rolls should be such, that although the opposed needles overlap to an extent permitting the needles to impale the batt from opposite sides, the points of the needles do not project or stab through the opposite surface of the batt. The flexibility of the needle mountings enables the needle to yield slightly and thereby avoid clashing of the needles.

EXAMPLE

*Padding for automobile door panels*

In this case, the wadding was 12-ply, and in uncompressed form, both before and after the treatment, it was .19 inch in thickness. Each ply was made of 100% sulphite or other chemical pulp with a dry weight of 1.7 pounds per 1000 square feet on the drying cylinder. The creping ratio was such that the weight of the multi-ply sheet just before needling was about 44 pounds per 1000 square feet. This weight included 6% of water on a bone dry basis in the roll of unneedled wadding.

Enough water was then added to the web by an atomizing spray to raise the water content of the wadding to about 8%.

The multi-ply web was then needled and the finished needled product after passing through the apparatus and after it had been rewound into the finished product roll 27, weighed approximately 41 pounds per 1000 square feet and contained about 7% of water on the dry basis. Careful measurements of the wadding before and after the needling treatment indicated that the length was increased about 8%.

By assembling together the several plies into a multi-ply web prior to needling, it is possible to include one or more plies or layers of different fiber or of different weights, or having different characteristics thereby enabling the finished product to satisfy a wide range of requirements.

I claim:

1. A process for mechanically interconnecting a plurality of superposed fibrous sheets of paper tissue which form a batt having a thickness substantially the same as that of the superposed tissue sheets prior to interconnection and having substantial resistance to delamination and shifting of the tissue sheets, said process comprising the steps of passing the batt through a throat not materially narrower than the thickness of the batt to thereby avoid reducing the batt thickness, and impaling the batt simultaneously from each of the opposite sides thereof incident to said passing of the batt through the throat by causing a pattern of needles on each of the opposite sides of the throat to travel through opposite, intermeshing angular paths at substantially the same speed and direction as the batt and with a plurality of the needles disposed in the direction of batt travel on each side of the throat impaled in the batt at all times, said impaling by the opposite needle patterns from each of the opposite batt sides being effective to a depth of at least one-half the batt thickness but less than the entire batt thickness to thereby prevent complete penetration through the batt.

2. A process for mechanically interconnecting a plurality of superposed fibrous sheets of crepe tissue which form a batt having a thickness substantially the same as that of the superposed tissue sheets prior to interconnection and having substantial resistance to delamination and shifting of the tissue sheets, said process comprising the steps of adding moisture to the batt to provide a moisture content from about 6 percent to about 12 percent on a bone dry basis, passing the batt through a throat wider than the thickness of the batt to thereby avoid reducing the batt thickness, and impaling the batt simultaneously from each of the opposite sides thereof incident to said passing of the batt through the throat by causing a pattern of needles on each of the opposite sides of the throat to travel through opposite and intermeshing angular paths at substantially the same speed and direction as the batt and with a plurality of the needles disposed in the direction of batt travel on each side of the throat impaled in the batt at all times, said impaling by the opposite needle patterns from each of the opposite batt sides being effective to a depth of at least one-half the batt thickness but less than the entire batt thickness to thereby prevent complete penetration through the batt.

References Cited in the file of this patent

UNITED STATES PATENTS

| Re. 21,890 | Walsh et al. | Aug. 26, 1941 |
| 232,962 | Harrington | Oct. 5, 1880 |
| 1,857,281 | Johnson | May 10, 1932 |